US012707128B2

(12) United States Patent
Lee et al.

(10) Patent No.: US 12,707,128 B2
(45) Date of Patent: Aug. 11, 2026

(54) SERVICE SYSTEM NOTIFYING DANGEROUS SITUATION THROUGH LINKAGE BETWEEN MOBILE TERMINAL AND SET-TOP BOX

(71) Applicant: ALT Co., Ltd., Seongnam-si (KR)

(72) Inventors: Sang Soo Lee, Seongnam-si (KR); Jong Wook Kim, Seoul (KR)

(73) Assignee: ALT Co., Ltd., Seongnam-si (KR)

( * ) Notice: Subject to any disclaimer, the term of this patent is extended or adjusted under 35 U.S.C. 154(b) by 0 days.

(21) Appl. No.: 18/890,776

(22) Filed: Sep. 20, 2024

(65) Prior Publication Data

US 2026/0059175 A1 Feb. 26, 2026

(30) Foreign Application Priority Data

Aug. 23, 2024 (KR) ........................ 10-2024-0113518

(51) Int. Cl.

*H04N 21/218* (2011.01)
*H04N 21/41* (2011.01)
*H04N 21/422* (2011.01)
*H04N 21/442* (2011.01)
*H04N 21/443* (2011.01)
*H04N 21/488* (2011.01)
*H04N 21/81* (2011.01)

(52) U.S. Cl.

CPC ....... *H04N 21/814* (2013.01); *H04N 21/4126* (2013.01)

(58) Field of Classification Search

None

See application file for complete search history.

(56) References Cited

U.S. PATENT DOCUMENTS

2006/0005219 A1* 1/2006 Owens ................ H04N 21/814 348/461
2012/0017250 A1* 1/2012 Tirasirikul .............. H04N 7/18 709/228
2021/0219023 A1* 7/2021 Sheng .................. A61B 5/0022
2023/0353975 A1* 11/2023 Thompson ............ H04W 4/023

FOREIGN PATENT DOCUMENTS

KR 10-0766889 B1 10/2007
KR 10-1678972 B1 11/2016

* cited by examiner

*Primary Examiner* — Brian T Pendleton
*Assistant Examiner* — Jean D Saint Cyr
(74) *Attorney, Agent, or Firm* — NKL Law; Jae Youn Kim

(57) ABSTRACT

Provided is a service system notifying dangerous situation through a mobile terminal and a set-top box. The service system notifying dangerous situation according to the present disclosure includes a protected person side set-top box, a protector side set-top box, and a service providing server which controls the protector side set-top box and/or a protector side mobile terminal to provide a notification message corresponding to a danger signal to a protector when a danger signal regarding occurrence of a dangerous situation of a protected person is received from the protected person side set-top box and/or a protected person side mobile terminal.

4 Claims, 4 Drawing Sheets

| GRADE LEVEL | NOTIFICATION DISPLAYING STYLE | VIBRATION OUTPUT | NOTIFICATION BELL OUTPUT |
|---|---|---|---|
| HIGH | HEADS-UP NOTIFICATION | O | O |
| HIGH | LOCK SCREEN NOTIFICATION | O | O |
| MEDIUM | NOTIFICATION DRAWER | O | X |
| MEDIUM | TOAST NOTIFICATION | O | X |
| MEDIUM | SNACKBAR NOTIFICATION | O | X |
| LOW | BADGE NOTIFICATION | X | X |
| LOW | IN-APP NOTIFICATION | X | X |

FIG. 3

| GRADE LEVEL | NOTIFICATION DISPLAYING STYLE | TV POWER OFF/ON SWITCH | VOICE/ NOTIFICATION BELL OUTPUT |
|---|---|---|---|
| HIGH | HEADS-UP NOTIFICATION | O | O |
| MEDIUM | SNACKBAR NOTIFICATION | O | X |
| LOW | TOAST NOTIFICATION | X | X |

FIG. 4

SERVICE SYSTEM NOTIFYING DANGEROUS SITUATION THROUGH LINKAGE BETWEEN MOBILE TERMINAL AND SET-TOP BOX

CROSS-REFERENCE TO RELATED APPLICATIONS

This application claims the priority of Korean Patent Application No. 10-2024-0113518 filed on Aug. 23, 2024, in the Korean Intellectual Property Office, the disclosure of which is incorporated herein by reference.

BACKGROUND OF THE INVENTION

Field of the Invention

The present disclosure relates to a service system notifying dangerous situation which provides a notification message according to each dangerous situation to a protector through a linkage between a set-top box and a mobile terminal when a dangerous situation occurs to a protected person.

Description of the Related Art

A set-top box (STB) refers to digital broadcasting transmission/reception equipment which receives broadcasts or content that cannot be received by a television (TV) itself, such as cable/satellite broadcasting or internet streaming to allow a user to watch them on the TV.

Recently, as services providing IP-based multimedia content have become widespread in accordance with the convergence of the Internet and broadcasting, most homes or offices with TVs have set-top boxes installed.

In the meantime, the number of single-person households living alone is continuously increasing socially, and in such a single-person living environment, it may be difficult to respond quickly to big or small dangerous situations. Specifically, if a dangerous situation occurs when an elderly (senior) person or a person with health problems is alone, they may not be able to ask for help to a protector or people around them in a timely manner or they may not be able to recognize the dangerous situation, which may result in them not being able to respond quickly to the dangerous situation to cause a great damage. Further, these problems may also arise when a child (kid) is in a dangerous situation while away from their parents (guardians) or out of the parent's protection area.

In order to solve these problems, recently, when a dangerous situation occurs to a protected person, such as an elderly person or a child, a dangerous situation notification service which provides a notification message for a dangerous situation to the protector through a mobile terminal such as a smart phone carried by the protector is being commercialized in various forms.

However, the dangerous situation notification service which provides a notification message for a dangerous situation through a mobile terminal of the protector has a problem in that in a situation when it is difficult for the protector to pay attention to the mobile terminal due to other work or activities or when the mobile terminal is not nearby (especially when the mobile terminal is set to a silent mode or a vibration mode), the protector cannot quickly and surely check the notification message, making it difficult to recognize the dangerous situation of the protected person in a timely manner.

As related art documents, there are Korean Registered Patent Publication No. 10-0766889 (entitled Behave monitoring system using set top box for interactive digital broadcasting, published on Oct. 15, 2007) and Korean Registered Patent Publication No. 10-1678972 (entitled Emergency system using set-top box and control method thereof, published on Nov. 24, 2016).

Related Art Document

Patent Document

Korean Registered Patent Publication No. 10-0766889 (Oct. 15, 2007)

Korean Registered Patent Publication No. 10-1678972 (Nov. 24, 2016)

SUMMARY OF THE INVENTION

An object of the present disclosure is to provide a service system notifying dangerous situation through a linkage between a mobile terminal and a set-top box which allows a protector to quickly and surely check a notification message through an image output device, such as a TV, connected to a set-top box at the protector's home, even in a situation when it is difficult for the protector to check a corresponding notification message through the mobile terminal such as a smart phone when a dangerous situation occurs to a protected person, and quickly respond to the dangerous situation of the protected person.

Another object of the present disclosure is to provide a service system notifying dangerous situation through a linkage between a mobile terminal and a set-top box which outputs a corresponding notification message when a dangerous situation occurs to a protected person to an image output device of a protector even when a set-top box of the protector is not in an operation mode, but in a standby mode or a power of the image output device connected to the set-top box is turned off.

Still another object of the present disclosure is to provide a service system notifying dangerous situation through a linkage between a mobile terminal and a set-top box which is focused on allowing the protector to check the notification message as quickly and reliably as possible, even if it may cause disturbance or inconvenience to the protector, in cases where the urgency of the dangerous situation occurring to the protected person is relatively high and is focused on reducing the disturbance or the inconvenience to the protector in cases where the urgency of the dangerous situation occurring to the protected person is relatively low, in a method of outputting the corresponding notification message when a dangerous situation occurs to the protected person to the protector's mobile terminal and/or the image output device connected to the protector's set-top box.

According to an aspect of the present disclosure, a service system notifying dangerous situation through a linkage between a mobile terminal and a set-top box includes a protected person side set-top box, a protector side set-top box, and a service providing server which controls the protector side set-top box and/or a protector side mobile terminal to provide a notification message corresponding to a danger signal to a protector when a danger signal regarding occurrence of a dangerous situation of a protected person is received from the protected person side set-top box and/or a protected person side mobile terminal.

Desirably, the service providing server transmits the notification message to the protector side set-top box to output the notification message to an image output device connected to the protector side set-top box.

Desirably, the service providing server checks a mode state of the protector side set-top box and a power state of the image output device and may transmit a control signal for switching the mode state of the protector side set-top box and/or the power state of the image output device to the protector side set-top box to output the notification message to the image output device.

Desirably, when the mode state of the protector side set-top box is a standby mode, the service providing server transmits a control signal for switching the mode state of the protector side set-top box to an operation mode to the protector side set-top box and when the power state of the image output device is OFF, the service providing server may transmit a control signal for switching the power state of the image output device to ON to the protector side set-top box.

Desirably, when the power state of the image output device is ON or the power state of the image output device is switched from OFF to ON, the service providing server checks an external input status and if the external input status is different from a communication port between the protector side set-top box and the service providing server, may transmit a control signal for changing the external input status to the communication port to the protector side set-top box.

Desirably, the service providing server provides a grade table in which a grade level and a notification output method at each grade are set in advance according to urgency for every dangerous situation of the protected person and when a danger signal regarding the occurrence of the dangerous situation of the protected person is received, the service providing server checks the grade level for the corresponding dangerous situation from the grade table to output the notification message to the image output device connected to the protector side set-top box and/or the protector side mobile terminal according to the notification output method at each grade.

Desirably, when the notification message is output to the image output device, the notification output method at each grade may include a setting content regarding whether to switch the power state of the image output device to OFF/ON, whether to output a voice or a notification bell, and a displaying style of the notification message on a screen of the image output device.

Desirably, when the notification message is output to the protector side mobile terminal, the notification output method at each grade may include a setting content regarding whether to output vibration of the protector side mobile terminal, whether to output a notification bell, and a displaying style of the notification message on a screen of the protector side mobile terminal.

Desirably, the grade level and the notification output method at each grade may be provided to change the setting through application or webpages provided by the protector side mobile terminal and/or the protector side set-top box, by the protector.

According to the exemplary embodiment of the present disclosure, a service system notifying dangerous situation through a linkage between a mobile terminal and a set-top box transmits a corresponding notification message when a dangerous situation occurs to a protected person to a set-top box at home of the protector to output the notification message on an image output device, such as a TV, connected to the set-top box, to allow a protector to quickly and surely check a notification message through the image output device, such as a TV of the protector, even in a situation when it is difficult for the protector to check the notification message through the mobile terminal such as a smart phone and thus quickly respond to the dangerous situation of the protected person by the protector.

According to the exemplary embodiment of the present disclosure, a service system notifying dangerous situation through a linkage between a mobile terminal and a set-top box checks a mode state of the set-top box at the protector's home and a power state of an image output device, such as a TV, connected to the set-top box and switches the mode state of the set-top box and/or the power state of the image output device of the protector if necessary, to output a notification message when a dangerous situation occurs to the protected person to an image output device of the protector even when the set-top box of the protector is not in an operation mode, but in a standby mode or the power of the image output device connected to the set-top box is turned off.

According to the exemplary embodiment of the present disclosure, a service system notifying dangerous situation through a linkage between a mobile terminal and a set-top box sets a grade level and a notification output method at each grade according to an urgency for every dangerous situation of a protected person in advance and outputs a notification message to a mobile terminal of the protector and/or an image output device connected to the set-top box of the protector according to the grade level and the notification output method at each grade when a dangerous situation occurs to the protected person to focus on allowing the protector to check the notification message as quickly and surely as possible, even if it may cause disturbance or inconvenience to the protector, in cases where the urgency of the dangerous situation occurring to the protected person is relatively high and focus on reducing the disturbance or the inconvenience to the protector in cases where the urgency of the dangerous situation occurring to the protected person is relatively low.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is a table of a notification output method at each grade to output a notification message to a protector side mobile terminal in a service system notifying dangerous situation of FIG. 1 as an example;

FIG. 4 is a table of a notification output method at each grade to output a notification message to an image output device connected to a protector side set-top box in a service system notifying dangerous situation of FIG. 1 as an example.

DETAILED DESCRIPTION OF THE EMBODIMENT

In order to sufficiently understand the present disclosure, the operational advantages of the present disclosure, and the objectives achieved by the exemplary embodiments of the present disclosure, the accompanying drawings illustrating preferred exemplary embodiments of the present disclosure and the contents described therein need to be referred to.

Hereinafter, the present disclosure will be described in detail by explaining preferred exemplary embodiments of the present disclosure with reference to the accompanying drawings. However, when the present disclosure is described, the description of the known functions or configurations will be omitted to clarify the gist of the present disclosure.

Figure 1:
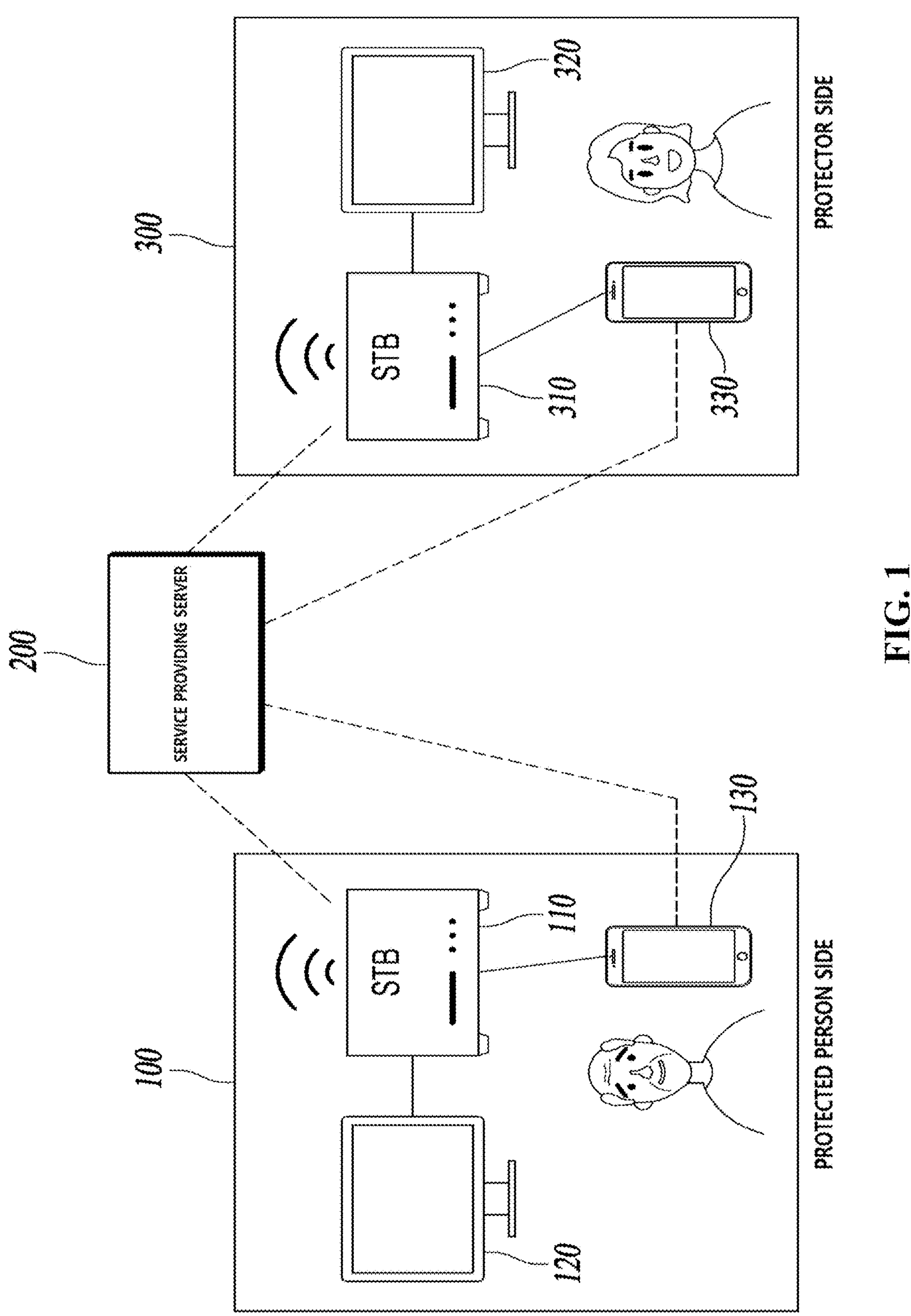
FIG. 1 is a view illustrating a configuration of a service system notifying dangerous situation through a linkage between a mobile terminal and a set-top box according to an exemplary embodiment of the present disclosure.
Figure 2:
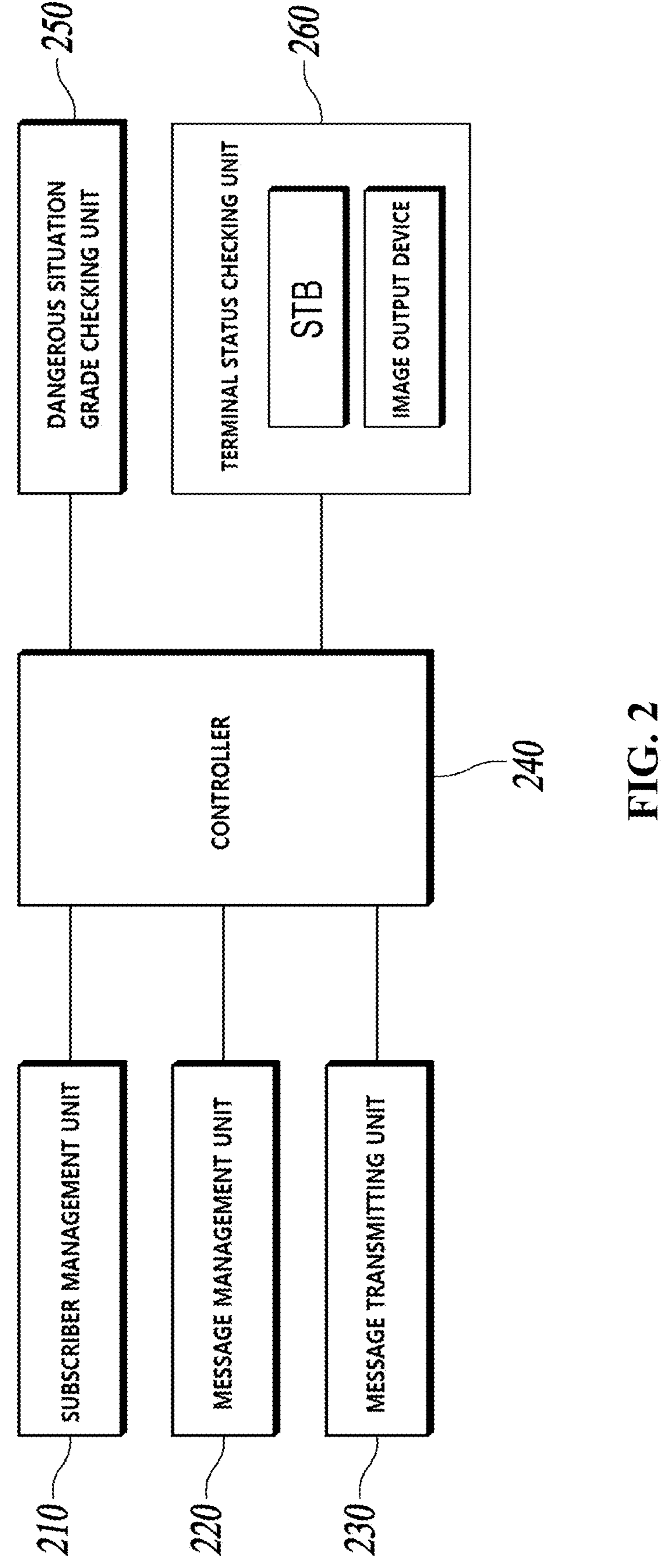
FIG. 2 is a view illustrating a configuration of a service providing server in a service system notifying dangerous situation of FIG. 1.

FIG. 1 is a view illustrating a configuration of a service system notifying dangerous situation through a linkage between a mobile terminal and a set-top box according to an exemplary embodiment of the present disclosure and FIG. 2 is a view illustrating a configuration of a service providing server in a service system notifying dangerous situation of FIG. 1.

A service system notifying dangerous situation through a linkage between a mobile terminal and a set-top box according to an exemplary embodiment of the present disclosure (hereinafter, simply referred to as a "service system notifying dangerous situation") includes a protected person side terminal 100, a protector side terminal 300, and a service providing server 200 which is communicatively connected to the protected person side terminal 100/protector side terminal 300 to receive/transmit data to notify a dangerous situation of the protected person to the protector.

Referring to FIG. 1, the protected person side terminal 100 may include a protected person side set-top box 110, an image output device 120 connected to the protected person side set-top box 110, a protected person side mobile terminal 130, and various sensors (not illustrated) connected to the protected person side set-top box 110.

A representative image output device 120 connected to the protected person side set-top box 110 is a television TV which is connected to the protected person side set-top box 110 through a high definition multimedia interface (HDMI) cable, and may also include a notebook, a monitor, and a tablet. The protected person side mobile terminal 130 may include a smart phone or a smart watch carried by the protected person and the protected person side mobile terminal 130 may be communicatively connected to the service providing server 200 through a mobile communication network or Internet network and may be communicatively connected to the protected person side set-top box 110 through a near field wireless communication network, such as Bluetooth.

Here, the protected person side mobile terminal 130, the protected person side set-top box 110, and various sensors (not illustrated) connected thereto may sense a dangerous situation of the protected person. For example, the protected person side mobile terminal 130 may have a camera, a timer, a gravity sensor, a position sensor, and a temperature sensor mounted therein and sense the dangerous situation of the protected person using the sensors.

When the protected person's dangerous situation is sensed, the protected person side set-top box 110 and/or the protected person side mobile terminal 130 may transmit a danger signal regarding the occurrence of the dangerous situation of the protected person to the service providing server 200. That is, the service providing server 200 may receive the danger signal regarding the occurrence of the dangerous situation of the protected person from the protected person side set-top box 110 and/or the protected person side mobile terminal 130.

In the meantime, in the present disclosure, the dangerous situation of the protected person may include all the situations when an elderly (senior) person, a child (kid), or a person with health problems, that is, the protected person needs outside help or needs protection. For example, the situations include: a situation when the protected person pushes an emergency rescue request (SOS) button on the mobile terminal or the set-top box (or a set-top box remote controller) to notify the protector of his or her emergency situation; a situation when the protected person does not use the mobile terminal for a predetermined period of time; a situation when an abnormal pattern is detected from the protected person's TV viewing, such as not watching TV at a certain time or during a favorite time slot as a result of monitoring the protected person's TV viewing pattern; a situation when an abnormal physical sign is detected from the protected person (for example, an abnormal heart rate, falling, etc.); and a situation when the protected person (especially, a child) leaves a safe zone set in advance by the protector.

As a method for sensing various dangerous situations which may occur to the protected person, various technologies that are already commercialized or well-known can be applied, so a detailed description of them will be omitted.

Referring to FIG. 1, the protector side terminal 300 includes a protector side set-top box 310, an image output device 320 connected to the protector side set-top box 310, and a protector side mobile terminal 330.

A representative image output device 320 connected to the protector side set-top box 310 is a television TV which is connected to the protector side set-top box 310 through an HDMI cable, and may also include a notebook, a monitor, and a tablet. The protector side mobile terminal 330 may include a smart phone or a smart watch carried by the protector and the protector side mobile terminal 330 may be communicatively connected to the service providing server 200 through a mobile communication network or Internet network and may be communicatively connected to the protector side set-top box 310 through a near field wireless communication network, such as Bluetooth.

Here, the protector side set-top box 310 receives a notification message corresponding to the danger signal of the protected person from the service providing server 200 and displays the notification message on a screen of the image output device 320 and the protector side mobile terminal 330 receives the notification message corresponding to the danger signal of the protected person from the service providing server 200 and displays the notification message on a screen of the protector side mobile terminal 330.

Referring to FIGS. 1 and 2, the service providing server 200 is communicatively connected to the protected person side terminal 100 and the protector side terminal 300, respectively, and receives a danger signal regarding the occurrence of the dangerous situation of the protected person from the protected person side set-top box 110 and/or the protected person side mobile terminal 130 which are the protected person side terminal 100 and controls the protector side set-top box 310 and/or the protector side mobile terminal 330 which is the protector side terminal 300 to provide the notification message corresponding to the received danger signal to the protector.

Here, the service providing server 200 may transmit a notification message corresponding to the danger signal to the protector side set-top box 310 and output the notification message to the image output device 320 connected to the protector side set-top box 310. Separately, the service providing server 200 may transmit a notification message corresponding to the danger signal to the protector side mobile terminal 330 and output the notification message to the protector side mobile terminal 330.

Desirably, the service providing server 200 may provide a grade table in which a grade level and a notification output method at each grade are set in advance according to the urgency for every dangerous situation of the protected person. When a danger signal regarding the occurrence of the dangerous situation of the protected person is received, the service providing server 200 confirms a grade level about the dangerous situation through the grade table to output the notification message to the image output device 320 connected to the protector side set-box 310 and/or the protector side mobile terminal 330 according to a notification output method at each grade.

When the notification message is output to the image output device 320, the notification output method at each grade may include a setting content regarding whether to switch a power state of the image output device 320 to OFF/ON, whether to output a voice or a notification bell, and a displaying style of a notification message on a screen of the image output device 320. At this time, whether to switch the power state of the image output device 320 to OFF/ON means whether to switch the power state of the image output device 320 to ON from OFF, that is, means whether to forcibly turn on the power when the power of the image output device 320 is turned off. Further, the voice or the notification bell may be output through a speaker embedded in the protector side set-top box 310, a speaker embedded in the image output device 320, or an external speaker connected to the protector side set-top box 310 or the image output device 320.

When the notification message is output to the protector side mobile terminal 330, the notification output method at each grade may include a setting content regarding whether to output a vibration of the protector side mobile terminal 330, such as a smart phone, whether to output a notification bell, and a displaying style of a notification message on a screen of the protector side mobile terminal 330.

In the meantime, a grade level according to a urgency for every dangerous situation of the protected person and a notification output method at each grade are set as a default by a service provider, but may be provided to allow the protector or the protected person to change the setting. However, the setting changing of the grade level and the notification output method at each grade by the protected person may be restricted. Specifically, the grade level and the notification output method at each grade may be provided to allow the protector to change the setting through an application or a web page provided through the protector side mobile terminal 330 and/or the protector side set-top box 310.

As described above, according to the present disclosure, the grade level and the notification output method at each grade according to the urgency for every dangerous situation of the protected person are set in advance and when the dangerous situation of the protected person occurs, the notification message is output to the image output device 320 connected to the protector side set-top box 310 and/or the protector side mobile terminal 330 according to the grade level of the dangerous situation and the notification output method at each grade. Accordingly, when the urgency of the dangerous situation is high, even though disturbance or the inconvenience is caused to the protector while watching the image output device 320, such as TV or for the life at home, it is focused on causing the protector to check the urgent notification message as quickly or surely as possible. In contrast, when the urgency of the dangerous situation is low, it is focused on reducing disturbance or the inconvenience in watching of the image output device 320, or the life at home, rather than causing the protector to check the notification message quickly or reliably.

For example, it is assumed that the grade level according to the urgency for every dangerous situation of the protected person is set to "high", "medium", and "low". When the grade level for the dangerous situation when the dangerous situation of the protected person occurs is "high" or "medium" for high urgency, if the power of the image output device 320 is turned off (the power state is OFF), that is, the user (protector) does not watch the image output device when the notification message is output to the image output device 320, the power of the image output device 320 is forcibly turned on (the power state is ON) according to the notification output method at each grade according to "high" or "medium" grade level and then the notification message may be output to the image output device 320.

In contrast, if the grade level for the dangerous situation when the dangerous situation of the protected person occurs is "low" for low urgency, when the power of the image output device 320 is turned off (the power state is OFF) when the notification message is output to the image output device 320, the notification message may not be output to the image output device 320 until the power of the image output device 320 is turned on by the user (protector) according to the notification output method at each grade according to "low" grade level. That is, when the dangerous situation of the protected person occurs, if the grade level for the corresponding dangerous situation is "low" for the low urgency, even though the power of the image output device 320 is turned off, the power of the image output device 320 is not forcibly turned on. At this time, when the dangerous situation of the protected person occurs, the notification message is transmitted to the protector side set-top box 310, but is not immediately output to the image output device 320 and when the power of the image output device 320 is turned on by the user, the notification message may be output to the image output device 320. In contrast, when a dangerous situation of the protected person occurs, the notification message is not transmitted to the protector side set-top box 310 but is held and when the power of the image output device 320 is turned on by the user, is transmitted to the protector set-top box 310 to be output to the image output device 320.

Desirably, during the process of outputting the notification message to the image output device 320 connected to the protector side set-top box 310, the service providing server 200 may check a mode state of the protector side set-top box 310 and a power state of the image output device 320. If it is necessary to output the notification message to the image output device 320, the service providing server 200 may transmit a control signal for switching the mode state of the protector side set-top box 310 and/or the power state of the image output device 320 to the protector side set-top box 310.

Specifically, as a result of checking the mode state of the protector side set-top box 310, when the mode state of the protector side set-top box 310 is a standby mode, the service providing server 200 may transmit the control signal for switching the protector side set-top box 310 to the operation mode to the protector side set-top box 310. As a result of checking the power state of the image output device 320, when the power state of the image output device 320 is OFF, the service providing server 200 may transmit a control signal for switching the power state of the image output device 320 to ON to the protector side set-top box 310. At this time, the protector side set-top box 310 which receives the control signal may display the notification message on the screen of the image output device 320 after turning on the power of the image output device 320 through the high definition multimedia interface (HDMI).

In order to deal with a case when an external input status of the image output device 320 is set differently from a communication port between the protector side set-top box 310 and the service providing server 200, it is desirable to check the external input status of the image output device 320 when the power state of the image output device 320 is turned on (ON) or the power state of the image output device 320 is switched from OFF to ON. When the external input status is a different port from a communication port between the protector side set-top box 310 and the service providing server 200 as a result of checking the external input status of the image output device 320, the service providing server 200 may transmit a control signal for changing the external input status to the same port as the communication port between the protector side set-top box 310 and the service providing server 200 to the protector side set-top box 310. At this time, the protector side set-top box 310 which receives the control signal may display the notification message on the screen of the image output device 320 after changing the external input status of the image output device 320 to the communication port between the protector side set-top box 310 and the service providing server 200 through the HDMI.

The service providing server 200 as described above may be implemented to include a subscriber management unit 210, a message management unit 220, a message transmitting unit 230, a controller 240, a dangerous situation grade checking unit 250, and a terminal status checking unit 260, as illustrated in FIG. 2.

The subscriber management unit 210 performs device-registration of the protected person side terminal 100 and the protector side terminal 300 through a service subscribing procedure and registers the relationship between the protected person and the protector through a link procedure.

The message management unit 220 stores and manages contents of a notification message (a notification message according to each dangerous situation) to be displayed according to the dangerous situation of the protected person, information about a grade level according to the urgency according to each dangerous situation of the protected person and a notification output method at each grade. At this time, the notification message according to each dangerous situation may be provided as texts, images, audios, or videos.

FIG. 3 is a table of a notification output method at each grade to output a notification message to a protector side mobile terminal and FIG. 4 is a table of a notification output method at each grade to output a notification message to an image output device connected to a protector side set-top box.

The message management unit 220 may set the grade level according to the urgency for every dangerous situation of the protected person to "high", "medium", and "low", as illustrated in FIG. 3. As a notification output method at each grade to output the notification message to the protector side mobile terminal 330 as illustrated in FIG. 3, the message management unit 220 may set a content regarding whether to output a vibration of the protector side mobile terminal 330, whether to output a notification bell, and a displaying style of a notification message on a screen of the protector side mobile terminal 330.

At this time, a displaying style of a notification message on the screen of the protector side mobile terminal 330 includes heads-up notification, lock screen notification, notification drawer, toast notification, snackbar notification, badge notification, and in-app notification, as illustrated in FIG. 3.

For reference, the heads-up notification is a notification style of displaying a pop-up notification message on the screen of the smart phone. The lock screen notification is a notification style of displaying a pop-up notification message on a screen when a smart phone is in a locked state, the notification drawer is a notification style of displaying an icon on a status-bar located on the top of the screen of the smart phone, the toast notification is a notification style of displaying the notification message on the bottom of the screen of the smart phone for a predetermined period of time and then disappearing, the snackbar notification is a notification style of displaying an additional action button, such as "calling" together with a notification message on the bottom of the screen of the smart phone, the badge notification is a notification style of displaying a badge on the application to prompt the user to run the application and check the notification message, and the in-app notification is a notification style of executing a notification message when the application is executed.

For example, when the grade level for the dangerous situation when the dangerous situation of the protected person occurs is "high" for the highest urgency, both the vibration and the notification bell are output and the notification message may be set to be output to the protector side mobile terminal 330 as a heads-up notification or lock screen notification to allow the protector to check the notification message as quickly and surely as possible. In contrast, when the grade level for the dangerous situation when the dangerous situation of the protected person occurs is "low" for the lowest urgency, both the vibration and the notification bell are not output, but the notification message may be set to be output to the protector side mobile terminal 330 as a badge notification or in-app notification so as not to cause the disturbance or inconvenience for the daily life of the protector.

The message management unit 220 may set the grade level according to the urgency for every dangerous situation of the protected person to "high", "medium", and "low", as illustrated in FIG. 4. As a notification output method at each grade to output the notification message to the image output device 320 connected to the protector side mobile terminal 310 as illustrated in FIG. 4, the message management unit 220 may set a content regarding whether to switch the power state of the image output device 320 to OFF/ON, whether to output a voice or a notification bell, and a displaying style of a notification message on a screen of the image output device 320.

At this time, a displaying style of a notification message on the screen of the image output device 320 includes heads-up notification, snackbar notification, and toast notification, as illustrated in FIG. 4.

For reference, the heads-up notification is a notification style of displaying a pop-up notification message on the screen of the TV, the snackbar notification is a notification style of displaying an additional action button, such as “status check” together with a notification message on the bottom of the screen of the TV, and the toast notification is a notification style of displaying the notification message on the bottom of the screen of the TV for a predetermined period of time and then disappearing.

For example, when the grade level for the dangerous situation when the dangerous situation of the protected person occurs is “high” for the highest urgency, if the power of the image output device 320 is turned off, a pop-up notification message may be set to be output to the image output device 320 while outputting the voice or the notification bell after forcibly turning on the power to allow the protector to check the notification message as quickly and reliably as possible. In contrast, when the grade level for the dangerous situation when the dangerous situation of the protected person occurs is “low” for the lowest urgency, if the power of the image output device 320 is turned off, the output of the notification message is held until the power of the image output device 320 is turned on by the user (protector) and when the power of the image output device 320 is turned on, the notification message may be set to be output to the image output device 320 as a toast message style without a voice or a notification bell output so as not to cause the disturbance or inconvenience in the daily life of the protector.

The message transmitting unit 230 transmits the notification message according to each dangerous situation when the dangerous situation of the protected person occurs to the protector side set-top box 310 and/or the protector side mobile terminal 330.

When the dangerous situation of the protected person occurs, if the danger signal about the occurrence of the dangerous situation of the protected person is received from the protected person side set-top box 110 and/or the protected person side mobile terminal 130, the dangerous situation grade checking unit 250 checks a grade level for the corresponding dangerous situation through the grade table. At this time, the grade level is divided into three grades, “high”, “medium”, and “low” as described above, but according to the present disclosure, the grade level may be divided into four or more grades according to the service policy without being limited thereto.

The terminal status checking unit 260 checks a mode state of the protector side set-top box 310 which transmits a notification message, a power state of the image output device 320 connected to the protector side set-top box 310, and an external input status of the image output device 320. The terminal status checking unit 260 transmits the checking result to the controller 240 and the controller 240 which receives the checking result may control the operations of the protector side set-top box 310 and the image output device 320 based on the checking result of the terminal status checking unit 260.

Here, the mode state of the protector side set-top box 310 may be divided into a standby mode and an operation mode, as described above. At this time, in the standby mode, a power of the set-top box is turned on, but the operation of the set-top box is in a standby state without being executed. In the operation mode, the power of the set-top box is turned on and the operation of the set-top box is being executed. Generally, in the standby mode, a power indicator of the set-top box is displayed in red and in the operation mode, is displayed in green. The standby mode and the operation mode may be switched by pressing a power button of the set-top box or a power button of a set-top box remote controller by a user. In the meantime, the power state of the image output device 320 may be divided into OFF and ON, as described above.

In order to provide a dangerous situation notification service according to the present disclosure, the controller 240 controls the overall operations of the subscriber management unit 210, the message management unit 220, the message transmitting unit 230, the dangerous situation grade checking unit 250, and the terminal status checking unit 260. Further, when the dangerous situation of the protected person occurs, the controller 240 may control the operations of the protector side set-top box 310 and/or the protector side mobile terminal 330 to receive a danger signal regarding the occurrence of the dangerous situation of the protected person from the protected person side set-top box 110 and/or the protected person side mobile terminal 130 and provide the notification message according to each dangerous situation to the protector.

Specifically, in order to output the notification message to the image output device 320 connected to the protector side set-top box 310 as described above, when the mode state of the protector side set-top box 310 is a standby mode, the controller 240 may transmit a control signal for switching the protector side set-top box 310 to the operation mode to the protector side set-top box 310 and when the power state of the image output device 320 is OFF, may transmit a control signal for switching the power state of the image output device 320 to ON to the protector side set-top box 310. When the external input status of the image output device 320 is different from the communication port between the protector side set-top box 310 and the service providing server 200, the controller 240 may transmit a control signal for changing the external input status to the same communication port to the protector side set-top box 310.

Figure 5:
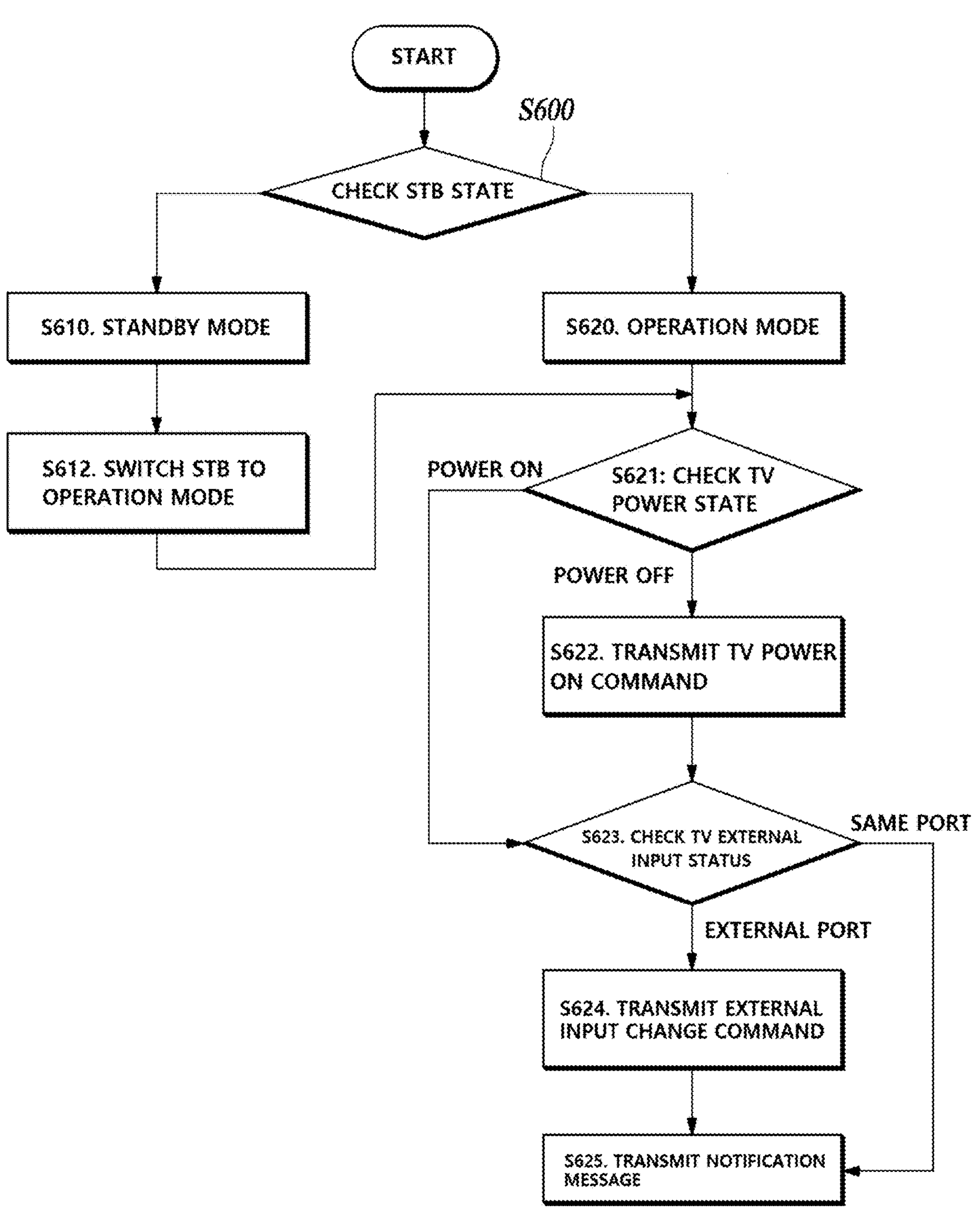
FIG. 5 is a flowchart illustrating a process of controlling operations of a protector side set-top box and an image output device to output a notification message to an image output device according to a state of the protector side set-top box and the image output device by a service providing server in a service system notifying dangerous situation of FIG. 1.

Hereinafter, a process of controlling the operation of the protector side set-top box and the image output device to output a notification message to the image output device according to the state of the protector side set-top box and the image output device, by a service providing server, in a service system notifying dangerous situation according to an exemplary embodiment of the present disclosure will be described with reference to FIG. 5.

First, the service providing server checks whether the mode state of the protector side set-top box STB is a standby mode or an operation mode (S600). When it is confirmed that the mode state of the protector side set-top box is a standby mode (S610), the service providing server transmits a control signal for switching the mode state of the protector side set-top box to an operation mode to the protector side set-top box to switch the protector side set-top box to an operation mode (S612).

Next, in the operation mode of the protector side set-top box (S620), the service providing server checks a power state of the image output device (for example, a TV) connected to the protector side set-top box (S621). Here, when the power state of the image output device is confirmed as OFF, the service providing server transmits a control signal or a command for switching the power state of the image output device to ON to the protector side set-top box to turn on the power of the image output device (S622).

Next, in a state in which the power of the image output device is turned on, the service providing server checks an external input status of the image output device connected to the protector side set-top box (S623). Here, when it is confirmed that the external input status of the image output device is different from the communication port between the protector side set-top box and the service providing server, the service providing server transmits a control signal or a command for changing the external input status of the image output device to the communication port between the protector side set-top box and the service providing server to the protector side set-top box to change the external input status of the image output device (S624).

Next, the service providing server transmits a notification message according to each dangerous situation to the protector side set-top box to output a notification message to the image output device connected to the protector side set-top box (S625).

Although the present disclosure has been described in detail above with the exemplary embodiments of the present disclosure, it is obvious to those skilled in the art that the present disclosure is not limited to the above-described exemplary embodiments, but various modifications and variations can be made without departing from the spirit and scope of the present disclosure. Accordingly, such modifications or variations should fall within the scope of the claims of the present disclosure.

What is claimed is:

1. A service system for providing notification of a dangerous situation, the system comprising:

a protected person side set-top box;

a protector side set-top box; and a service providing server which controls the protector side set-top box linked to a protector side mobile terminal to provide a notification message corresponding to a danger signal to a protector when the danger signal regarding occurrence of the dangerous situation of a protected person is received from the protected person side set-top box and/or a protected person side mobile terminal, wherein the protected person side set-top box and the protected person side mobile terminal are linked to one another;

wherein the service providing server transmits the notification message to the protector side set-top box to output the notification message to an image output device connected to the protector side set-top box;

wherein when a power state of the image output device is ON or the power state of the image output device is switched from OFF to ON, the service providing server checks an external input status of the image output device, and when the external input status of the image output device is a different port from a communication port between the protector side set-top box and the service providing server as a result of checking the external input status of the image output device, the service providing server transmits a first control signal for changing the external input status to the communication port to the protector side set-top box so that the notification message is output to the image output device;

wherein the service providing server checks a mode state of the protector side set-top box and the power state of the image output; and wherein when the mode state of the protector side set-top box is a standby mode, the service providing server transmits a second control signal for switching the mode state of the protector side set-top box to an operation mode to the protector side set-top box and when the power state of the image output device is OFF, the service providing server transmits a third control signal for switching the power state of the image output device to ON to the protector side set-top box.

2. The service system according to claim 1, wherein the service providing server provides a grade table in which a grade level and a notification output method at each grade are set in advance according to urgency for every dangerous situation of the protected person and when the danger signal regarding the occurrence of the dangerous situation of the protected person is received, the service providing server checks the grade level for the corresponding dangerous situation from the grade table to output the notification message to the image output device connected to the protector side set-top box and/or the protector side mobile terminal according to the notification output method at each grade.

3. The service system according to claim 2, wherein when the notification message is output to the image output device, the notification output method at each grade includes a setting content regarding whether to switch the power state of the image output device to OFF/ON, whether to output a voice or a notification bell, and a displaying style of the notification message on a screen of the image output device and when the notification message is output to the protector side mobile terminal, the notification output method at each grade includes a setting content regarding whether to output vibration of the protector side mobile terminal, whether to output the notification bell, and a style of displaying the notification message on a screen of the protector side mobile terminal.

4. The service system according to claim 2, wherein the grade level and the notification output method at each grade are provided to change the setting through application or webpages provided by the protector side mobile terminal and/or the protector side set-top box, by the protector.

* * * * *